United States Patent [19]

Yashima et al.

[11] Patent Number: 4,508,944
[45] Date of Patent: Apr. 2, 1985

[54] HANDLE SWITCH ASSEMBLY FOR MOTORCYCLES

[75] Inventors: Michio Yashima, Kawagoe; Akihiro Komatsu, Nerima; Masami Takanashi, Yokohama; Masashi Hirose, Wako; Kengo Nakayama, Iruma, all of Japan

[73] Assignee: Honda Motor Co., Ltd., Tokyo, Japan

[21] Appl. No.: 481,635

[22] Filed: Apr. 4, 1983

[30] Foreign Application Priority Data

| Apr. 5, 1982 | [JP] | Japan | 57-49175[U] |
| Apr. 5, 1982 | [JP] | Japan | 57-49176[U] |
| Apr. 5, 1982 | [JP] | Japan | 57-49177[U] |
| Apr. 5, 1982 | [JP] | Japan | 57-49178[U] |
| Apr. 5, 1982 | [JP] | Japan | 57-49179[U] |
| May 31, 1982 | [JP] | Japan | 57-80358[U] |

[51] Int. Cl.³ .............................................. H01H 9/06
[52] U.S. Cl. .................................. 200/61.85; 200/5 E; 200/157
[58] Field of Search ................ 200/5 E, 61.85, 157, 200/340, 328; 340/134, 135; 180/219

[56] References Cited

U.S. PATENT DOCUMENTS

| 2,502,042 | 3/1950 | Hasselbaum | 200/5 E |
| 2,593,337 | 4/1952 | O'Brien | 200/328 |
| 4,455,463 | 6/1984 | Rohl | 200/61.85 |

FOREIGN PATENT DOCUMENTS 2844797 4/1979 Fed. Rep. of Germany ...... 180/219

Primary Examiner—A. D. Pellinen
Assistant Examiner—Morris Ginsburg
Attorney, Agent, or Firm—Arthur L. Lessler

[57] ABSTRACT

A handle switch assembly is arranged on the steering handle in the vicinity of a handle grip, and includes at least one switch comprising a plurality of first push buttons arranged on a surface of the switch housing, and a second push button arranged in a manner independent and separate from the first push buttons. Each of the first push buttons, when pushed, causes the switch to turn on and holds same in the on-state, while the second push button, when pushed, releases the switch from its on-state. The first push buttons are juxtaposed axially of the handle grip, and the second push button is spaced in a predetermined circumferential direction from a line connecting between side edges of the first push buttons facing in the same predetermined circumferential direction.

9 Claims, 10 Drawing Figures

HANDLE SWITCH ASSEMBLY FOR MOTORCYCLES

BACKGROUND OF THE INVENTION

This invention relates to a handle switch assembly for motorcycles, and more particularly to a handle switch assembly of this kind, which has improved operatability as well as improved operating feeling.

A motorcycle in general is provided with switches for turning on and off the headlight, the winkers (turn signal lamps), the horn, etc., which are assembled as a handle switch assembly and accommodated in a switch housing mounted on the steering handle in the vicinity of a handle grip, so as to permit the driver to operate the switches while he is gripping the steering handle with his hands. A conventional handle switch assembly of this kind is constructed such that the individual switches of the handle switch assembly have respective operating knobs outwardly projected on a surface of the switch housing, and the driver moves these knobs in a sliding manner or the like with his thumb or finger from one position to another one in axial directions of the handle grip or in directions perpendicular to the axis of the grip.

According to such handle switch assembly, for a switching action, the driver has to move his thumb or finger through a rather large stroke substantially equal to the moving distance of each operating knob, and further he has to move each of the knobs along the surface of the switch housing for changing its position. Therefore, limitations are imposed upon designing the arrangement of these operating knobs and the moving distances of same.

By the above reasons, the conventional handle switch assembly fails to provide satisfactory operability and satisfactory operating feeling, particularly in that the driver cannot smoothly and positively operate the operating knobs while he is gripping the handle grip with his hands during running and he cannot easily discriminate the position of each operating knob from those of the others by the feeling of his knob.

SUMMARY OF THE INVENTION

It is an object of the invention to provide a handle switch assembly for motorcycles, which has a so-called lock and release mechanism in which pushing of each of switching-on push buttons turns a switch on, and pushing of a switching-off push button arranged independently and separately from the switching-on push buttons releases the switch from its on-state, wherein the arrangement, sizes and configurations of the individual push buttons are designed so as to facilitate discrimination of the switching-off push button from the other or switching-on push buttons, thereby improving the operability and operating feeling.

It is a further object of the invention to provide a handle switch assembly for motorcycles, in which the arrangement, sizes and configurations of the pushing surfaces of the switching-on push buttons and the switching-off push button are designed so as to facilitate discrimination of each of the push buttons from the others, thereby further enhancing the operability and operating feeling.

According to the present invention, a housing is arranged on the steering handle in the vicinity of one of the handle grips, and accommodates a plurality of switches. At least one of the above switches includes a plurality of first push buttons and one second push button. The first push buttons are arranged on a surface of the housing in a manner juxtaposed along a line extending axially of the above one handle grip, and are each adapted to cause the above at least one switch to be switched on and thereafter held in an on-state when it is pushed. The second push button is adapted to cause the above at least one switch to be switched from on-state to off-state when it is pushed. The second push button is arranged on the above surface of the housing in a manner spaced in a predetermined circumferential direction from a line connecting between side edges of the first push buttons facing in the above predetermined circumferential direction.

The above and other objects, features and advantages of the invention will be more apparent from the ensuing detailed description taken in connection with the accompanying drawings.

DETAILED DESCRIPTION

Figure 2:
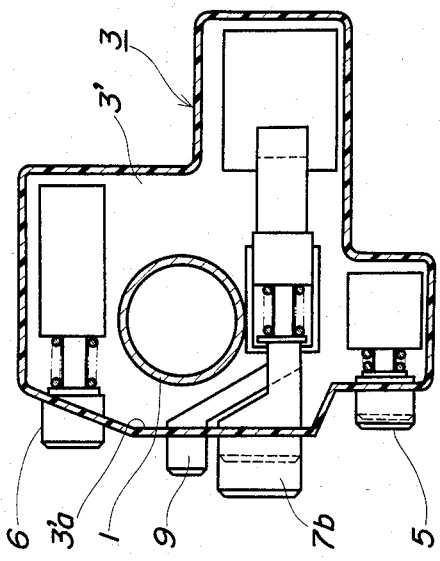
FIG. 2 is a schematic cross-sectional view of the handle switch assembly of FIG. 1, taken along line II—II in FIG. 1.

The invention will now be described in detail with reference to the drawings showing embodiments thereof.

Referring first to FIGS. 1 through 5, there is illustrated a first embodiment of the invention which is applied to the winker switch of a motorcycle. A switch housing 3' forming part of a handle switch assembly 3 is mounted on a steering handle or handle bar 1 of the motorcycle, at a location adjacent a handle grip 2 mounted on a left end of the handle bar 1 for steering the motorcycle and in such a manner that an operating surface 3'a of the housing is slightly slanted toward the driver. The switch housing 3' accommodates a plurality of different switches for respective switching actions by means of operations of respective push buttons. That is, the switch housing 3' carries push buttons 4 and 5 arranged on the operating surface 3'a at a lower side for respective switching-on and -off of a passing light switch and a horn switch, neither of which is shown, and a push button 6 arranged on the same surface 3'a at the opposite or upper side for switching-on and -off of a switch, not shown, for changeover of the radiating direction of the headlight of the motorcycle.

Switching-on push buttons 7a and 7b of a winker switch 7 and a switching-off push button 9 of same are arranged on the operating surface 3'a of the switch housing 3' at a location intermediate between the push buttons 4, 5 and the push button 6. The above switching-on push buttons 7a, 7b are adapted to actuate respective left and right winkers, not shown. The switching-off push button 9 is arranged on the operating surface 3'a of the switch housing 3' in a manner independent from the switching-on push buttons 7a, 7b, that is, at a location separate therefrom, and is interlocked with the push buttons 7a, 7b by means of a lock plate 8, etc., hereinafter referred to. That is, as clearly shown in FIGS. 4 and 5, contacts 10a and 10b, which are operatively connected to the respective switching-on push buttons 7a, 7b, and a stopper 10c engaging with the switching-off push button 9 are secured in a juxtaposed manner by a switch holder 12 screwed on an inner wall of the switch housing 3', with the stopper 10c interposed between the contacts 10a, 10b. The lock plate 8 is disposed for movement through the switch holder 12 axially of the handle grip 2, as indicated by the arrow in FIG. 5. When the switching-on push button 7a or 7b for the left winker or the right winker is pushed, the contacts 10a or 10b are brought into an on position, and thereafter locked in the same on position by the lock plate 8 to keep the left winker or right winker in the on-state. To be concrete, as shown in FIG. 6, push rods $7a_2$ and $7b_2$ are formed integrally with the switching-on push buttons 7a, 7b, respectively, and extend in the direction in which the push buttons 7a, 7b are pushed. The push rods $7a_2$ and $7b_2$ are formed with respective protuberances $7a_2'$ and $7b_2'$ having slanted surfaces, and penetrate through respective through holes 8a and 8b formed in the lock plate 8. As the push buttons 7a, 7b are pushed, the above protuberances pass the through holes 8a, 8b in the lock plate 8, while simultaneously urging the same plate 8 by its slanted surfaces to displace it in the leftward direction as viewed in FIG. 6. The lock plate 8 is permanently urged by a return spring 8', and accordingly is returned to its original position after the protuberance $7a_2'$ or $7b_2'$ has passed through its corresponding through hole 8a or 8b. Then, the protuberance $7a_2'$ or $7b_2'$ of the push rod $7a_2$ or $7b_2$ comes into contact with the lower surface of the lock plate 8 to lock the push rod in its on position. On this occasion, a movable contact, not shown, carried on a lower end portion of the push rod $7a_2$ or $7b_2$ is brought into a position closing a pair of fixed contacts, not shown, on the contacts 10a or 10b, to turn the contacts on.

On the other hand, the switching-off push button 9 is formed integrally with a push rod $9_2$. When the push button 9 is pushed, the lock plate 8 is urgedly displaced by a slanted surface $9_2'$ formed in the push rod $9_2$ in the leftward direction as viewed in FIG. 6 to release the above engagement of the push rod $7a_2$ or $7b_2$ with the lock plate 8. Then, the push button 7a or 7b is returned to its original position by the force of a return spring 13a or 13b interposed between the push button and the contacts opposed thereto, to release the associated winker from its on-state. On this occasion, the switching-off push button 9 is not locked in the pushed position but automatically returned to its original position by a return spring 13c when the thumb or finger is detached therefrom, because the push rod $9_2$ has an upper side surface $9_2''$ upwardly extending straight from the slanted surface $9_2'$. The stopper 10c engages the push rod 9 in a manner limiting its maximum stroke.

Figure 5:
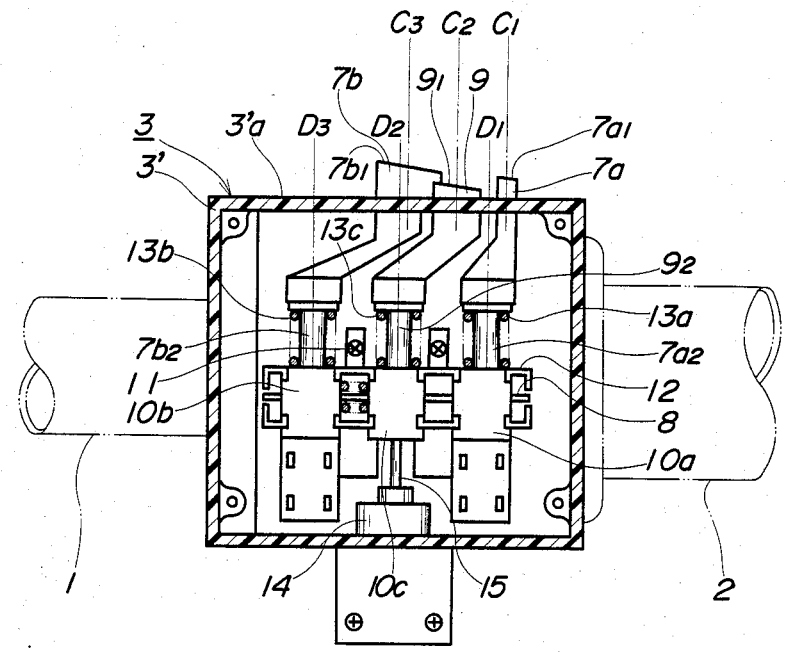
FIG. 5 is a view of the same handle switch assembly, with its essential part shown in longitudinal section.
Figure 6:
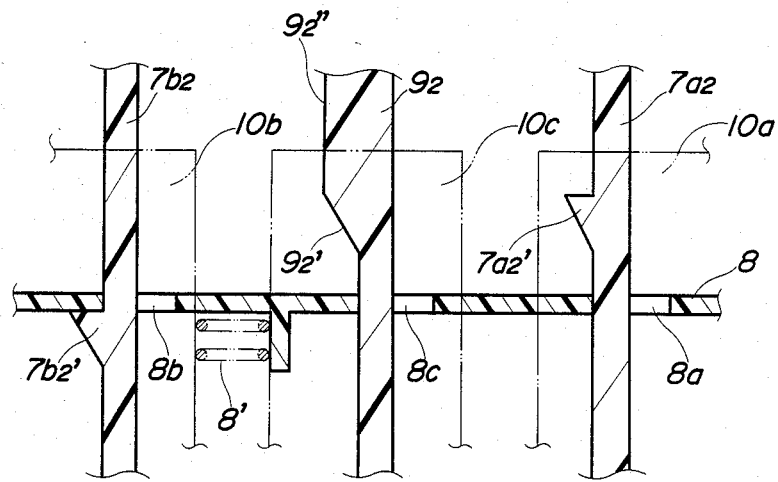
FIG. 6 is a schematic fragmentary sectional view showing, on an enlarged scale, the engagement of the push rods with the lock plate, both appearing in FIG. 5.

As shown in FIG. 5, a solenoid 14 is arranged on the switch housing 3' at a location below the stopper 10c for the switching-off push button 9, and a rod 15 is coupled to the push rod $9_2$. Thus, when the solenoid 14 is energized, the rod 15 is downwardly pulled to cause switching-off of the winker switch 7. This solenoid 14 is adapted to be energized by a signal indicative of the angular position of the handle bar 1, i.e. termination of turning of the motorcycle to the left or to the right, to automatically displace the push rod $9_2$ in the on-state releasing direction.

Figure 1:
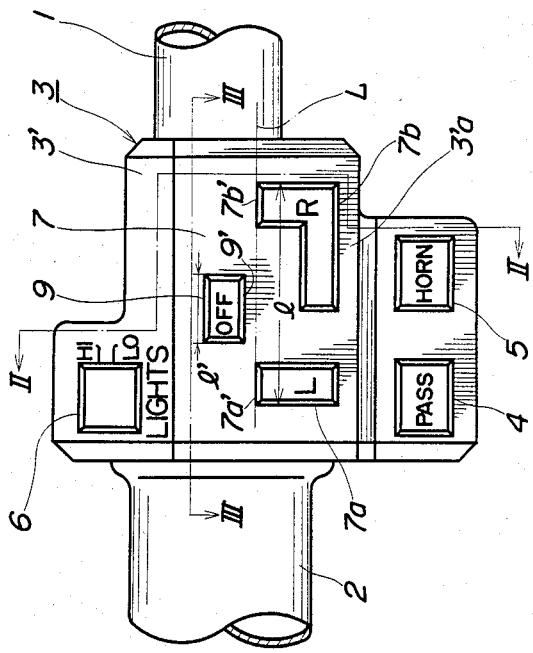
FIG. 1 is a schematic top plan view of a handle switch assembly for motorcycles according to a first embodiment of the present invention.

In the illustrated embodiment, as shown in FIGS. 1 and 2, the switching-on push buttons 7a, 7b are arranged on the operating surface 3'a of the switch housing 3' in a manner juxtaposed along a line extending in the axial direction of the handle grip 2, and the switching-off push button 9 is arranged on the operating surface 3'a with its lower side edge 9' facing the upper side edges 7a', 7b' of the push bottons 7a, 7b and spaced upwardly in the circumferential direction from a line L extending between these upper side edges 7a', 7b'.

With the above described arrangement in which push buttons are used for switching operation of the winker switch 7, the operation of turning the winker switch 7 on or off can be performed simply by pushing the push button 7a, 7b or 9 with the thumb or finger. This enables anyone to perform the switching operation in a much easier manner, irrespective of the size of his thumb or finger, and with better operating feeling than the conventional type requiring sliding movement of the operating knobs on the surface of the switch housing.

Further, since as noted above, the switching-off push button 9 is arranged on an operating surface of the switch housing 3' in a manner separate from the switching-on push buttons for releasing the on-states established by the latter through the interlocking mechanism (the lock plate 8), the winker switch can be switched off merely by pushing the push button 9, permitting the driver's thumb or finger to be moved through a much less distance, thereby enabling a very quick switching operation. In addition, since the switching-off push button 9 is slightly circumferentially upwardly spaced from the line L connecting between the upper side edges of the switching-on push buttons 7a, 7b juxtaposed axially of the handle grip 2, it is possible to easily discriminate the location of the switching-off push button 9 from the other push buttons by the feeling of the thumb or finger, permitting accurate switching operation, irrespective of the length and thickness of the thumb or finger.

According to the present embodiment, besides above the arrangements and configurations of the switching-on and -off push buttons 7a, 7b and 9 are designed as described hereinbelow, so as to further improve the operatability and operating feeling of the handle switch:

First, a portion of the switching-off push button 9 outwardly projected above the upper surface 3'a of the switch housing 3' has an elongate rectangular shape and has its longitudinal axis directed in the axial direction of the handle grip 2. Further, it has an axial size l' set at a value smaller than the line width l of the switching-on push buttons 7a, 7b juxtaposed axially of the handle grip 2, that is, the distance between the outer end faces of the two push bottons 7a, 7b. This arrangement of the push buttons further facilitates discrimination of the switching-off push button 9, permitting the driver to perform a prompt operation of turning the winker switch 7 on and off.

Next, the pushing surfaces $9_1$, $7a_1$ and $7b_1$ of the push buttons 9, 7a and 7b have their axial centers C2, C1 and C3 offset toward the handle grip 2 with respect the axes or radial centers D2, D1 and D3 of the respective push rods $9_2$, $7a_2$ and $7b_2$, as seen in FIG. 5. And, the remoter from the handle grip the push button is located, the larger the offset amount is. To realize this, the push buttons 7a, 7b and 9 have their portions inside the switch housing 3' bent in a direction away from the handle grip. Alternatively of the illustrated arrangement, part of the push buttons, for instance, 9 and 7a alone, may have such offset configurations. Since in the illustrated embodiment, the winker switch 7 is formed of three parallel switch units with its contacts and stopper arranged axially of the handle grip 2, the pushing surface of the push button remotest from the handle grip 2 would otherwise be rather distant from the handle grip, i.e. from the driver's hand. However, according to the above arrangement of the invention, even the pushing surface of the remotest push button can be located close to the handle grip 2, permitting accurate and prompt turning-on and -off operation.

Figure 3:
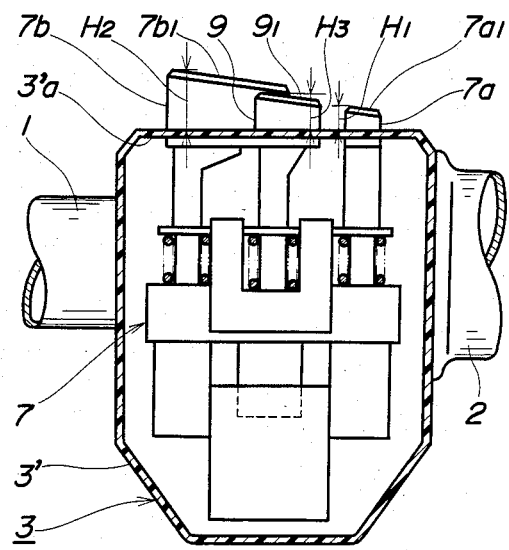
FIG. 3 is a schematic longitudinal sectional view of the same handle switch assembly, taken along line III-—III in FIG. 1.
Figure 4:
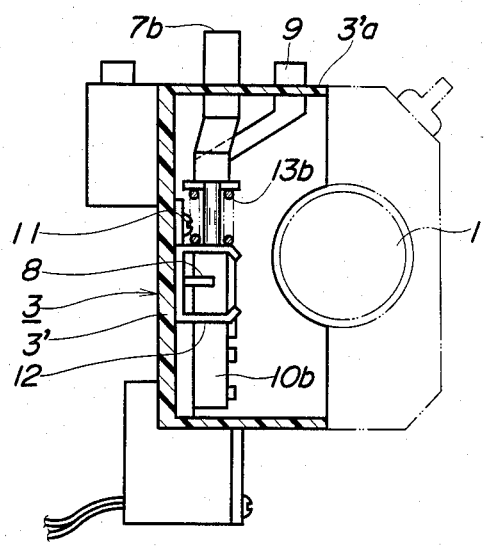
FIG. 4 is a view of the handle switch assembly, with its essential part shown in cross section.

Further, as shown in FIG. 3, the heights H1 and H2 of the portions of the switching-on push buttons 7a, 7b outwardly projected from the operating surface $3'a$ of the switch housing 3' are different from the height H3 of the switching-off push button 9, and in such a manner that the height is larger as the push button is located remoter from the handle grip 2. That is, in the illustrated embodiment in FIG. 3, the height H1 of the leftmost switching-on push button 7a is lowest, the switching-off push button 9 next lowest, and the rightmost switching-on push button 7b highest, respectively.

Since the differences are provided in height between the switching-off push button 9 and the switching-on push buttons 7a, 7b, the driver can easily and accurately discriminate the kind of the push button upon touching it with his thumb or finger. Moreover, since the height becomes larger as the push button is remoter from the handle grip 2, any push button is immediately accessible, irrespective of its distance from the handle grip or the driver's hand, also enhancing the positive operability.

In addition, the pushing surfaces $7a_1$, $7b_1$ and $9_1$ of the switching-on push buttons 7a, 7b and switching-off push button 9 are each slanted in such a manner that its height becomes gradually smaller toward the side closer the handle grip 2, as clearly shown in FIGS. 3 and 5. This permits the driver's thumb to fit the slanted pushing surfaces very snugly and tightly, facilitating pushing same, thereby further enchancing the operating feeling as well as the operatability.

Figure 8:
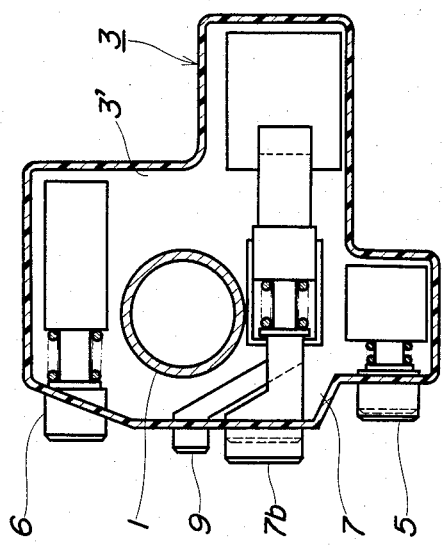
FIG. 8 is a schematic cross-sectional view of the handle switch assembly of FIG. 7, taken along line VIII—VIII in FIG. 7.
Figure 7:
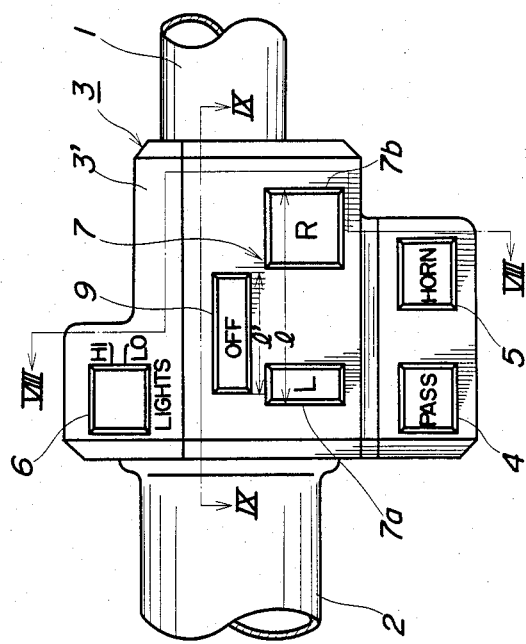
FIG. 7 is a schematic top plan view of a handle switch assembly for motorcycles, according to a second embodiment of the invention.
Figure 9:
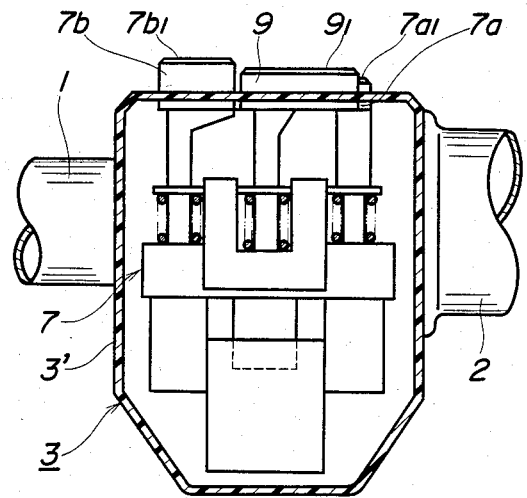
FIG. 9 is a schematic longitudinal sectional view of the handle switch assembly of FIG. 7, taken along line IX—IX in FIG. 7.

FIGS. 7 through 9 illustrate a second embodiment of the invention. In these figures, identical numerals are given to those elements corresponding to those illustrated in FIGS. 1 through 6. The handle switch assembly 3 according to this embodiment is different from the first embodiment in that the switching-off push button 9 has a larger size l' in the axial direction of the handle grip 2 than that of the first embodiment, the surfaces $7a_1$, $7b_1$ and $9_1$ of the push buttons 7a, 7b and 9 extend parallel with the operating surface $3'a$ of the switch housing 3', and the pushing surface $7b_1$ of the push button 7b is square, but is substantially identical with the first embodiment in other respects. Therefore, further description of this embodiment is omitted.

Figure 10:
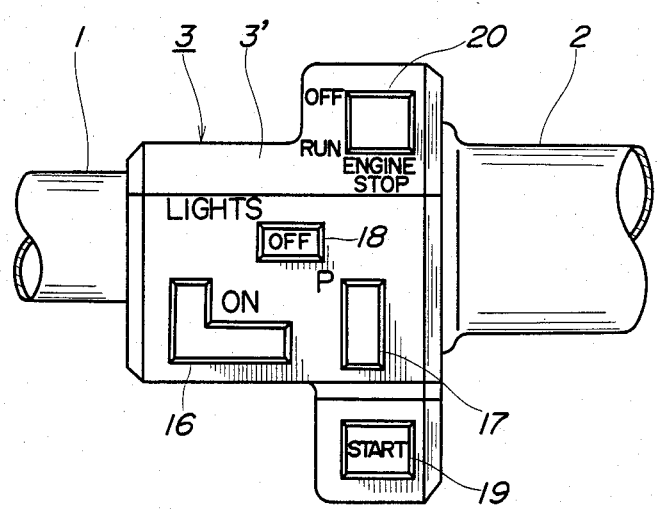
FIG. 10 is a schematic top plan view of a handle switch assembly for motorcycles, according to a third embodiment of the invention, having an alternative push button arrangement which operates in a manner similar to the first embodiment.

FIG. 10 illustrates a third embodiment of the handle switch assembly according to the invention. According to this embodiment, the handle switch assembly 3 is arranged on a right end of the handle bar 1 and in the vicinity of the right-hand handle grip 2 and is applied to a switch for turning on and off a headlight and a position light mounted on the motorcycle, neither of which is shown. Reference numerals 16-18 designate a switching-on push button for the headlight, a switching-on push button for the position light, and a switching-off push button, respectively, which correspond, respectively, to the switching-on push buttons 7a, 7b and the switching-off push button 9 in the first embodiment. The operation of the handle switch assembly 3 according to this embodiment can be identical with that of the first embodiment. For instance, when the headlight switching-on push button 16 is pushed, its corresponding contacts, not shown, are brought into its on position to turn the headlight on, and then locked in the on position, and when the switching-off push button 18 is pushed, the switch is released from its on-state to turn the headlight off.

In FIG. 10, reference numerals 19 and 20 designate an engine starting switch and a switch for emergency stoppage of the engine, respectively.

While preferred embodiments have been described, it is to be understood that any modifications or variations will occur to those skilled in the art within the scope of the appended claims.

What is claimed is:

1. A handle switch assembly for use in a motorcycle in combination with a pair of handle grips mounted on opposite ends of a steering handle, said handle switch assembly comprising:

a housing arranged around said steering handle in the vicinity of one of said handle grips and having one surface extending transversely and generally contoured circumferentially of said one of said handle grips; and a plurality of switches arranged in said housing, at least one of said switches including a plurality of push buttons arranged on said one surface of said housing, said push buttons being juxtaposed on said one surface of said housing along a line extending axially of said one of said handle grips, with each of said push buttons having a side face facing in the same predetermined circumferential direction of said one of said handle grips, and a plurality of push rods integrally connected to respective ones of said push buttons, said push rods each having an axis thereof extending in a direction in which a corresponding one of said push buttons may be pushed, said push buttons each having a pushing surface adjacent said one surface of said housing, at least a part of each push button remote from said one of said handle grips having the pushing surface thereof offset toward said one of said handle grips with respect to the axis of the corresponding integrally connected push rod, said push buttons each having a portion thereof outwardly projected from said one surface of said housing, the projected portion of each push button having a volume greater than that of any of said push buttons closer to said one of said handle grips.

2. A handle switch assembly as claimed in claim 1, wherein said projected portions of said push buttons are different in height from each other.

3. A handle switch assembly as claimed in claim 1, wherein each of said projected portions of said push buttons has a height greater than that of any of said push buttons closer to said one of said handle grips.

4. A handle switch assembly as claimed in claim 1, wherein said pushing surfaces of said push buttons are projected outwardly from said one surface of said housing, each of said pushing surfaces being slanted so that the height thereof gradually decreases toward said one of said handle grips.

5. A handle switch assembly as claimed in claim 1, wherein said at least one switch comprises a winker switch.

6. A handle switch assembly as claimed in claim 1, wherein said at least one switch includes a switch for turning on and off a headlight and a position light mounted on said motorcycle.

7. A handle switch assembly as claimed in claim 1, wherein each of said pushing surfaces of said push buttons has an area larger than that of any of said push buttons closer to said one of said handle grips.

8. A handle switch assembly for use in a motorcycle in combination with a pair of handle grips mounted on opposite ends of a steering handle, said handle switch assembly comprising:
   a housing arranged around said steering handle in the vicinity of one of said handle grips and having one surface facing toward a driver position on the motorcycle, said one surface extending transversely and generally contoured circumferentially of said one of said handle grips; and
   a plurality of switches arranged in said housing, at least one of said switches including a plurality of first push buttons arranged on said one surface of said housing,
      each of said first push buttons, when pushed, being adapted to cause said at least one switch to be switched on and thereafter held in an on-state,
      said first push buttons being juxtaposed on said one surface of said housing along a line extending axially of said one of said handle grips, with each of said first push buttons having an upper side face facing in the same predetermined circumferential direction of said one of said handle grips, and
   a second push button arranged on said one surface of said housing separate from said first push buttons and having a pushing surface located in the vicinity of said axially extending line of said one of said handle grips,
      said second push button, when pushed, being adapted to cause said at least one switch to be switched from said on-state to an off-state thereof,
      said second push button having a lower side face facing said upper side faces of said first push buttons, said lower side face of said second push button being spaced upwardly from a line extending between said upper side faces of said first push buttons, in a circumferential direction of said one of said handle grips.

9. A handle switch assembly as claimed in claim 8, wherein said second push button has a substantially rectangular shape, said second push button having a length, in the direction of said axially extending line of said one of said handle grips, not exceeding the entire length of said line along which said first push buttons are juxtaposed.

* * * * *